(12) United States Patent
Yukawa

(10) Patent No.: US 7,072,271 B2
(45) Date of Patent: *Jul. 4, 2006

(54) OPTICAL HEAD, OPTICAL RECORDING AND/OR REPRODUCING APPARATUS AND INTEGRATED OPTICAL MODULE

(75) Inventor: Hiroaki Yukawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/075,502

(22) Filed: Mar. 9, 2005

(65) Prior Publication Data

US 2005/0163018 A1 Jul. 28, 2005

Related U.S. Application Data

(63) Continuation of application No. 09/592,013, filed on Jun. 12, 2000, now Pat. No. 6,906,991.

(30) Foreign Application Priority Data

Jul. 13, 1999 (JP) .................................. 11-199479

(51) Int. Cl.
*G11B 7/00* (2006.01)
(52) U.S. Cl. .................................. 369/112.05; 369/121
(58) Field of Classification Search ..................... None
See application file for complete search history.

(56) References Cited

U.S. PATENT DOCUMENTS

| 4,502,762 | A | 3/1985 | Anderson |
| 5,696,749 | A | 12/1997 | Brazas, Jr. et al. |
| 5,717,674 | A | 2/1998 | Mori et al. |
| 6,091,691 | A | 7/2000 | Yoo et al. |
| 6,181,668 | B1 | 1/2001 | Kajiyama et al. |

FOREIGN PATENT DOCUMENTS

| EP | 0 860 819 | 8/1998 |
| EP | 0 932 145 | 7/1999 |
| EP | 1 001 413 | 5/2000 |
| WO | WO 98 13826 | 4/1998 |

*Primary Examiner*—Paul W. Huber
(74) *Attorney, Agent, or Firm*—Frommer Lawrence & Haug LLP; William S. Frommer

(57) ABSTRACT

An optical head includes a light emitter/detector to emit a laser light towards an optical disc and to detect a return light from the optical disc, a diffraction grating to split the laser light into three beams, and a light converging optical system to focus the laser light on a recording surface of the optical disc. The diffraction grating has formed therein a plurality of slits formed whose depth is selected so that the efficiency of diffraction of first-order light when a first light beam is incident upon the diffraction grating is higher than that when a second light beam having a longer wavelength than the first light beam is incident upon the diffraction grating.

2 Claims, 5 Drawing Sheets

OPTICAL HEAD, OPTICAL RECORDING AND/OR REPRODUCING APPARATUS AND INTEGRATED OPTICAL MODULE

This is a continuation of application Ser. No. 09/592,013, filed Jun. 12, 2000 now U.S. Pat. No. 6,906,991, the entirety of which is incorporated herein by reference.

BACKGROUND OF THE INVENTION

A. Field of the Invention

The present invention relates to an optical head adapted to read information from an optical disc by irradiating a laser light on the optical disc, and an optical recording and/or reproducing apparatus provided with the optical head.

B. Related Art

Referring now to FIG. 7, a conventional diffraction grating is shown. The diffraction grating is generally indicated by reference numeral 30. The diffraction grating 30 has formed therein a plurality of slits having a depth D and a cycle a. Assuming that the refractive index of a medium of the diffraction grating 30 upon which a light is incident is $n_0$ and that of a medium of the diffraction grating 30 from which the light exits is $n_1$, if the slit depth D is sufficiently smaller than the slit cycle a of the diffraction grating 30 (a>>D) and if the slit cycle a is sufficiently larger than the wavelength $\lambda$ of a laser light incident upon the diffraction grating 30, the design of the diffraction grating will fit a scalar theory which will be described later. By a calculation based on the scalar theory fitting, the efficiency of diffraction of zero-order light of the diffraction grating 30, namely, a ratio in intensity between the incident light and zero-order light, is given by the following formula (1).

$$\cos^2\{(n_1-n_0)D\pi/\lambda\} \quad (1)$$

The efficiency of diffraction of first-order light of the diffraction grating 30 is given by the following formula (2):

$$(2/\pi)^2 \sin^2\{(n_1-n_0)D\pi/\lambda\} \quad (2)$$

For the conventional optical head provided with this diffraction grating 30 and adapted to split, by the diffraction grating 30, a laser light into three beams and effect a tracking servo control by the three-beam method and the conventional optical recording and/or reproducing apparatus using the optical head, the slit depth D of the diffraction grating 30 is selected for the formulae (1) and (2) to meet the following formula (3):

$$0<(n_1-n_0)D\pi/\lambda<\pi/2 \quad (3)$$

In the optical head and optical recording and/or reproducing apparatus using a plurality of laser beams different in wavelength from each other, if the slit depth D of the diffraction grating 30 is selected based on the formula (3) in order to dispose the diffraction grating 30 in a common place where two laser beams of different wavelengths ($\lambda_m$ and $\lambda_n$, and $\lambda_m<\lambda_n$) will pass, the efficiency of diffraction of first-order light of the laser beam having the wavelength $\lambda_m$ is higher than that of the laser beam having the wavelength $\lambda_n$.

Then, when for a tracking servo control of the laser light of the wavelength $\lambda_n$, the light beam is split into three beams to adopt the three-beam method while for tracking servo control of the laser light of the wavelength $\lambda_m$, any method other than the three-beam method is adopted. More specifically, when it is desired to use the zero-order light, first-order light and negative first-order light of the laser light having the wavelength $\lambda_n$ and only the zero-order light of the light beam having the wavelength $\lambda_m$, the laser light of the wavelength $\lambda_m$, is diffracted with a result that the efficiency for light power utilization is worse. At this time, undesired diffracted light is produced from the laser light of the wavelength $\lambda_m$, which leads to an increased tray light.

OBJECTS OF THE INVENTION

Therefore, it is an object of the present invention to provide an optical head which avoids the aforementioned deficiencies of the prior art.

It is also an object of the present invention to provide an optical head with improved light power utilization efficiency to suppress the stray light.

It is further an object of the present invention to provide an optical recording and/or reproducing apparatus which incorporates such an optical head.

Various other objects, advantages and features of the present invention will become readily apparent from the ensuing detailed description and the novel features will be particularly pointed out in the appended claims.

SUMMARY OF THE INVENTION

The above objects can be attained by providing an optical head including a light emitter/detector for emitting a laser light towards a recording surface of an optical disc having information optically recorded thereon and for detecting a return light component of the laser light reflected at the recording surface of the optical disc to detect at least a tracking error signal. The optical head also includes a diffraction grating provided between the light emitter/detector and the optical disc to split the laser light emitted from the light emitter/detector into at least three beams, and a light converging optical system provided between the diffraction grating and optical disc to converge the lights split by the diffraction grating to the recording surface of the optical disc.

The light emitter/detector of the optical head according to the present invention includes a first light source to emit a first light beam and a second light source to emit a second light having a shorter wavelength than the first light beam. In addition, the diffraction grating is formed of a plurality of slits whose depth is selected so that the efficiency of diffraction of first-order light when the first light beam is incident upon the diffraction grating is higher than that when the second light beam is incident upon the diffraction grating.

In the aforementioned optical head according to the present invention, since the slit depth of the diffraction grating is selected so that the efficiency of diffraction of first-order light when the first light beam is incident upon the diffraction grating is higher than that when the second light beam is incident upon the diffraction grating, the first light beam is split by the diffraction grating but the second light beam is only slightly split. Thus, in this optical head, it is possible to suppress stray light of the second light beam and thus attain an improved light power utilization efficiency.

Also the above object can be attained by providing an optical recording and/or reproducing apparatus including means for rotating an optical disc having information recorded thereon, an optical head to emit a light towards a recording surface of the optical disc and to detect a return light from the optical disc, and a signal processing circuit to process a signal detected by the optical head.

The optical head incorporated in the above optical recording and/or reproducing apparatus includes a light emitter/detector for emitting a laser light towards a recording surface of an optical disc having information optically recorded thereon and for detecting a return light component of the laser light reflected at the recording surface of the optical disc to detect at least a tracking error signal. A diffraction grating is provided between the light emitter/detector and the optical disc to split the laser light emitted from the light emitter/detector into at least three beams, and a light converging optical system is provided between the diffraction grating and optical disc to converge the lights split by the diffraction grating to the recording surface of the optical disc. The light emitter/detector includes a first light source to emit a first light beam and a second light source to emit a second light beam having a shorter wavelength than the first light beam.

Also, in the above optical recording and/or reproducing apparatus according to the present invention, the diffraction grating is formed of a plurality of slits whose depth is selected so that the efficiency of diffraction of first-order light when the first light beam is incident upon the diffraction grating is higher than that when the second light beam is incident upon the diffraction grating.

In the above optical recording and/or reproducing apparatus according to the present invention, since the diffraction grating includes a plurality of slits whose depth is selected so that the efficiency of diffraction of first-order light when the first light beam is incident upon the diffraction grating is higher than that when the second light beam is incident upon the diffraction grating, the first light beam is split by the diffraction grating but the second light beam is only slightly split. Thus, in this optical head, it is possible to suppress stray light of the second light beam and thus attain an improved light power utilization efficiency.

BRIEF DESCRIPTION OF THE DRAWINGS

The following detailed description given by way of example, but not intended to limit the invention solely to the specific embodiments described, may be best understood in conjunction with the accompanying drawings in which.

DETAILED DESCRIPTION OF CERTAIN PREFERRED EMBODIMENTS

Figure 1:
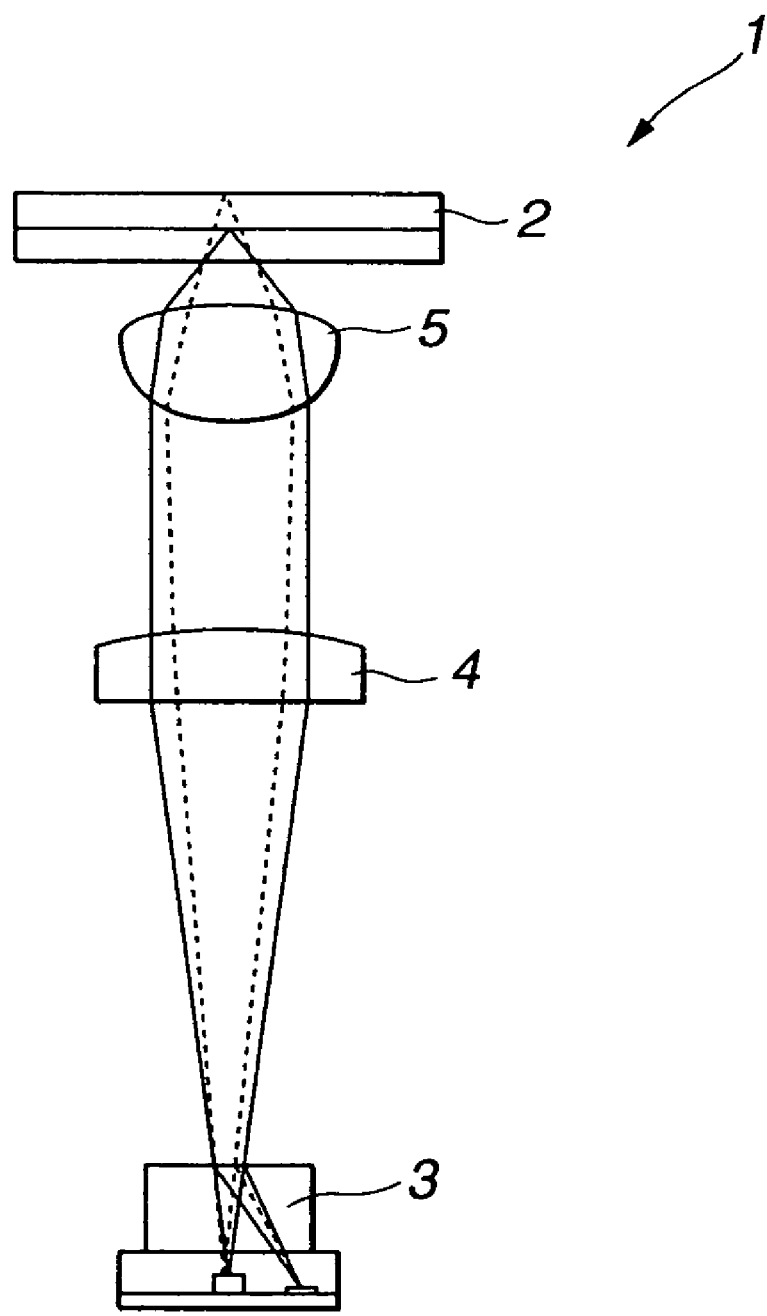
FIG. 1 is a schematic representation of a preferred embodiment of an optical head in accordance with the teachings of the present invention.

These objects and other objects, features and advantages of the present invention will become more apparent from the following detailed description of the preferred embodiments of the present invention when taken in conjunction with the accompanying drawings wherein like reference numerals represent like features in the several views.

Referring now to FIG. 1, there is shown a preferred embodiment of an optical head according to the present invention. The optical head is generally indicated by reference numeral 1. The optical head 1 reads information from an optical disc 2, and includes an integrated optical module 3, collimator lens 4, and an objective lens 5. The optical disc 2 referred to herein includes a compact disc (CD) and digital video or versatile disc (DVD). Namely, the optical head 1 is compatible with optical discs 2 of different types, and it reads information from the optical discs 2 using laser beams of different waveforms, respectively.

Figure 2:
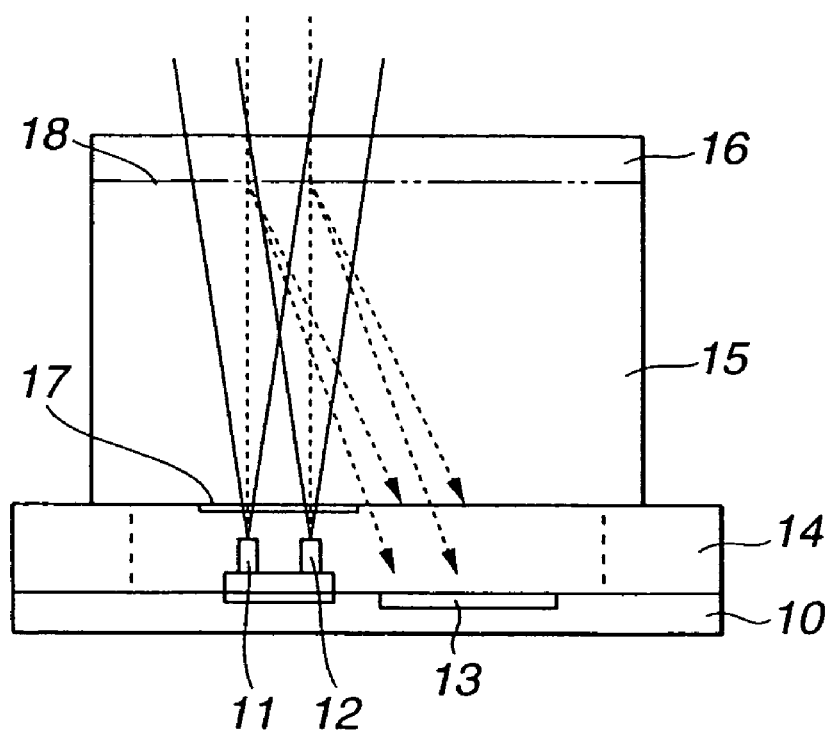
FIG. 2 is a schematic representation of the integrated optical module of the optical head of FIG. 1.

The integrated optical module 3 is formed by integrating a light emitter, light detector and a prism using semiconductor technology. FIG. 2 shows a preferred embodiment of an integrated optical module 3 of the optical head 1 of FIG. 1.

As shown in FIG. 2, the integrated optical module 3 includes a silicon substrate 10, first and second light emitters 11 and 12 disposed on the silicon substrate 10, a light detector 13 and package 14 disposed on the silicon substrate 10, a prism 15 disposed on the package 14 and a wave plate 16 disposed on the prism 15.

The first and second light emitters 11 and 12 are light sources, respectively, such as a semiconductor laser utilizing the recombination radiation of a semiconductor, for example. The first light emitter 11 emits a laser light of approximately 785 nm in wavelength. The laser light having the wavelength of approximately 785 nm is used to read information from the optical disc 2, such as a CD. The second light emitter 12 emits a laser light of approximately 655 nm in wavelength. The laser light having the wavelength of approximately 655 nm is used to read information from the optical disc 2, such as a DVD. The first and second light emitters 11 and 12 are disposed on the silicon substrate 10 with a space of about 100 to 200 □m between them radially of the optical disc 2.

The light detector 13 detects a return light from the optical disc 2 thereby to detect a signal. The light detector 13 consists of photodetectors adapted to provide signals corresponding to light amounts detected by them.

The package 14 is designed in the form of a hollow rectangular cylinder. The package 14 is disposed on the silicon substrate 10 to enclose the first and second light emitters 11 and 12 and the light detector 13.

The prism 15 is in the form of a parallelopiped rectangular, and it is disposed on the package 14. That is, the first and second light emitters 11 and 12, the light detector 13 and the prism 15 disposed on the silicon substrate 10 are located in the hollow portion of the package 14.

The wave plate 16 is disposed on the prism 15. The wave plate 16 is adapted to impart a phase difference of a quarter wavelength to the DVD-oriented laser light and provide a random relation between the direction of polarization of the laser light and the direction of recording pits on the optical disc 2. Also, the wave plate 16 changes the polarization of a light going towards the optical disc 2 and a return light going away from the optical disc 2.

The integrated optical module 3 includes a diffraction grating 17 disposed on a surface of the prism 15 facing the silicon substrate 10 with the package 14 being positioned between the prism 15 and the silicon substrate 10. The diffraction grating 17 is formed integrally with the prism 15. The diffraction grating 17 diffracts the laser light emitted from the first or second light emitters 11 or 12 to split the light into at least three laser beams, namely, a diffracted light of a zero-order light, a diffracted light of a positive first-order light and a diffracted light of a negative first-order light.

Further, a holographic element 18 is disposed on a surface of the prism 15 facing the wave plate 16. The holographic element 18 is formed integrally with the prism 15, and splits the return light into two beams.

In the optical head 1 as set forth above, the depth of slits formed in the diffraction grating 17 is appropriately selected so that the efficiency of diffraction of first-order light of the laser light having the wavelength of approximately 785 nm emitted from the first light emitter 11 is higher than that of the laser light having the wavelength of approximately 655 nm emitted from the second light emitter 12. The efficiency of diffraction of an n-order light of the diffraction grating 17, described herein, refers to a ratio ($I_n/I$) of the intensity (I) of an incident light upon the diffraction grating 17 and intensity ($I_n$) of an n-order light diffracted by the diffraction grating 17.

For a tracking servo control by the three-beam method in a CD-oriented optical system of the optical head also including a DVD-oriented optical system using a laser beam different in wavelength from the CD-oriented laser beam, a diffraction grating to split the CD-oriented laser light into three beams is required. The diffraction grating should preferably be inserted in an optical path for the CD-oriented laser light, separate from that for the DVD-oriented laser light. However, if the CD- and DVD-oriented optical systems are integrally provided in the integrated optical module 3 as in the aforementioned optical head 1, the diffraction grating is also integrally provided in the integrated optical module 3 and the DVD-oriented laser light is unavoidably split by the diffraction grating.

In the conventional optical head, the depth of slits formed in the diffraction grating is selected for optimum efficiencies of diffraction of zero-order light and first-order light of the CD-oriented laser light. In this case, the efficiency of diffraction of zero-order light of the DVD-oriented laser light is lower than those of zero-order light and first-order light of the CD-oriented laser light. The lower efficiency of diffraction of zero-order light of the DVD-oriented laser light will cause a lower power utilization efficiency of the DVD-oriented laser light and an increase of stray light.

Since the efficiency of diffraction of laser light varies depending upon the slit depth of the diffraction grating in a cycle corresponding to the wavelength of the laser light, it has been found by the applicants herein that the efficiencies of diffraction of two or more light beams of different wavelengths could be optimized at the same time by changing the slit depth of the diffraction grating.

The calculation of an efficiency of diffraction of a diffraction grating based on a scalar theory will next be described hereinbelow.

Figure 3:
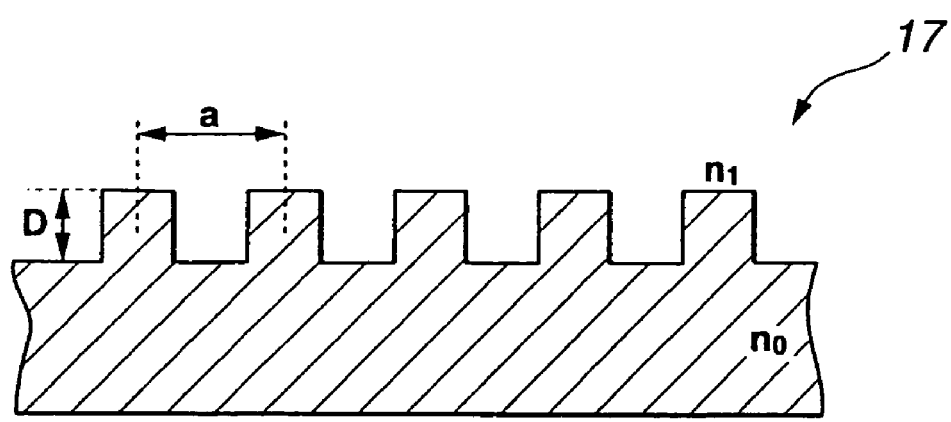
FIG. 3 is a schematic representation of an example of slits formed in the diffraction grating of the optical head of FIG. 1.

Calculation of Efficiency of Diffraction of Light-Transmissive Convex Diffraction Grating First, a diffraction grating of a light-transmissive convex type having slits formed therein as shown in FIG. 3 will be considered. Assume that the depth of slits formed in the diffraction grating is D and the slit cycle is a. Assume also that the refractive index of a medium of the diffraction grating upon which a light incident is no and that of a medium of the diffraction grating from which the light exits is no. Based on these assumptions, the slit depth D of the diffraction grating is sufficiently smaller than the slit cycle a (a>>D) and the slit cycle a is sufficiently larger than the wavelength λ of a light incident upon the diffraction grating, the design of the diffraction grating will fit a scalar theory as follows:

$$I \text{ (zero-order light)} = \cos^2\{(D/\lambda)(n_1 - n_0)\pi\} \quad (4)$$

$$I(n\text{-order light; } n \text{ is odd}) = \{2/(n\pi)\}^2 \sin^2\{(D/\lambda)(n_1 - n_0)\pi\} \quad (5)$$

$$I(n\text{-order light; } n \text{ is even}) = 0 \quad (6)$$

Figure 4:
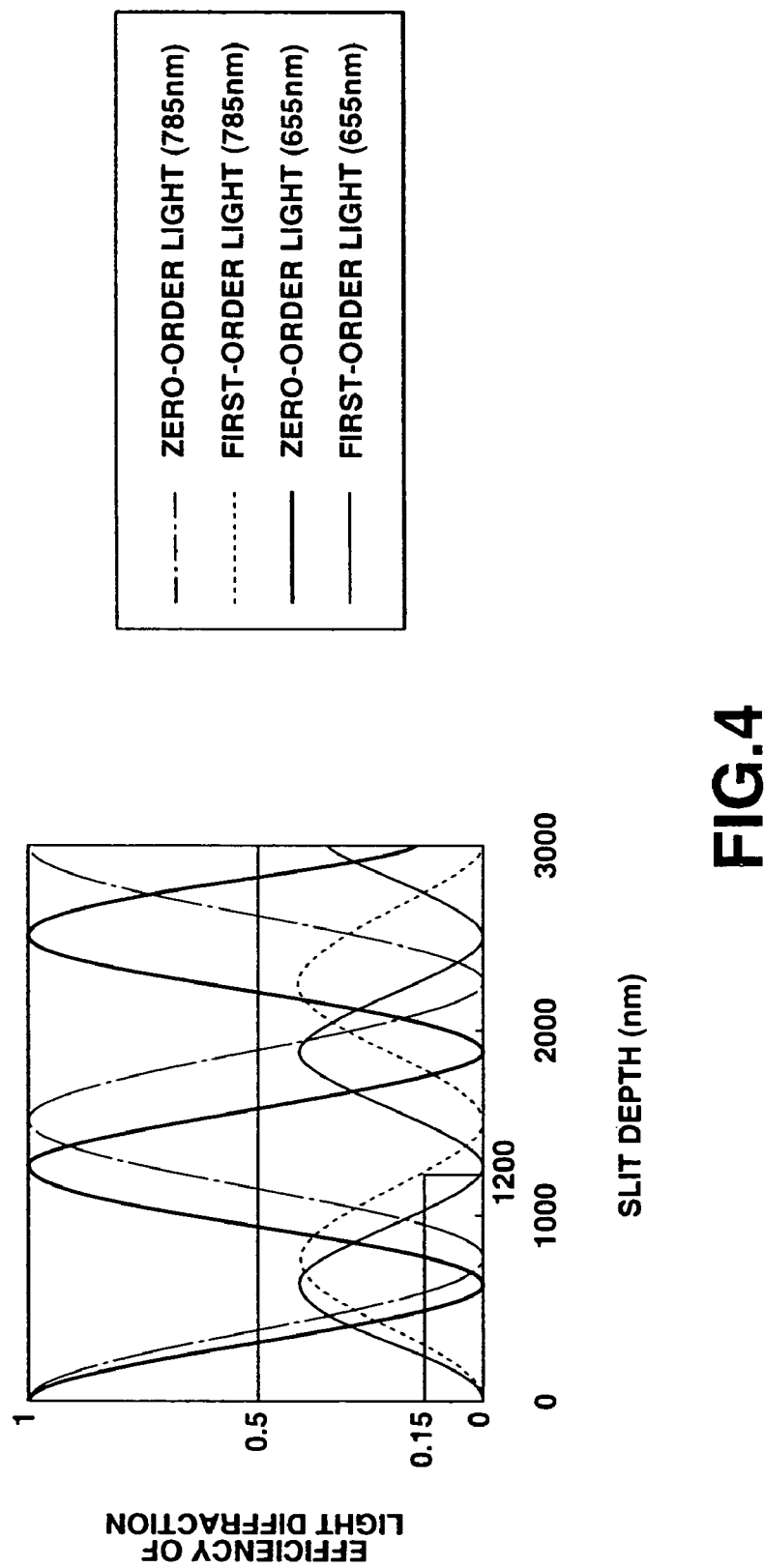
FIG. 4 is a chart showing the relationship between the efficiency of light diffraction and slit depth of the diffraction grating of FIG. 3.

Referring now to FIG. 4, the relationship between the efficiency of light diffraction and the slit depth of the aforementioned light-transmissive convex diffraction grating is shown, calculated by the formulae (4) to (6) for light beams of approximately 655 nm and approximately 785 nm, respectively, in wavelength. In FIG. 4, the zero-order light of a laser light of approximately 655 nm in wavelength is indicated by a thick solid line and the first-order light is indicated by a thin solid line. The zero-order light of a laser light having a wavelength of approximately 785 nm is indicated with a dashed line and the first-order light is indicated by a thin broken line. As shown, the efficiency of diffraction varies in a cycle corresponding to the wavelength.

More specifically, when the slit depth is sufficiently smaller than the grid pitch, the efficiency of diffraction of the zero-order light of the DVD-oriented laser light is lower than that of the zero-order light of the CD-oriented laser light, as is shown in FIG. 4. Since the cycle of the efficiency of diffraction varies depending upon the wavelength of the laser light, however, as the slit depth is increased, the relation in magnitude between the efficiency of diffraction of the zero-order light of the DVD-oriented laser light and that of the zero-order light of the CD-oriented laser light is inverted, namely, the efficiency of diffraction of the zero-order light of the DVD-oriented laser light is higher than that of the zero-order light of the CD-oriented laser light.

In the optical head 1 according to the present invention, the slit depth of the diffraction grating 17 is appropriately selected so that the efficiency of diffraction of the first-order light of the CD-oriented laser light having the wavelength of approximately 785 nm is higher than that of the first-order light of the DVD-oriented laser light having the wavelength of approximately 655 nm.

As mentioned above, the efficiency of diffraction will vary depending upon the slit depth of the diffraction grating 17 in a constant cycle which corresponds to the wavelength of a laser light. By utilizing the difference in cycle between the efficiencies of diffraction corresponding to the wavelength to trace the cycle, a target efficiency of diffraction for a plurality of wavelengths can be determined. Using this method, it is possible to control the efficiency of diffraction for each wavelength when the diffraction grating 17 is disposed in a common optical path for the plurality of wavelengths.

However, if the slit depth is non-negligibly larger than the grid pitch, the aforementioned formulae will not be valid. That is, the grid pitch has to be sufficiently wider than the slit depth.

More particularly, as shown in FIG. 4 for example, when the slit depth of the diffraction grating is 1200 nm for example, the efficiency of diffraction of the first-order light of the DVD-oriented laser light having the wavelength of 655 nm can be limited to almost zero and that of the first-order light of the CD-oriented laser light having the wavelength of 785 nm can be set to approximately 15%. Thereby, the efficiency of diffraction of the first-order light of the DVD-oriented laser light can be set to nearly zero and thus the CD-oriented light beam can be split into three beams. Diffracted high-order light of the DVD-oriented laser light is necessary for reading information from a DVD. Thus, any high-order light of the DVD-oriented laser light can be suppressed, any stray light can be prevented from occurring, and the light power utilization efficiency can be prevented from being reduced.

In the optical head 1 according to the present invention, the efficiency of diffraction of the first-order light of the DVD-oriented laser light having the wavelength of approximately 655 nm should preferably be lower than 5% and the efficiency of diffraction of the first-order light of the CD-oriented laser light having the wavelength of approximately 785 nm should preferably be higher than 5%. It is only the CD-oriented laser light whose tracking is servo-controlled by the three-beam method that has to be split by the diffraction grating 17 into three beams. Thus, if the efficiency of diffraction of the first-order light of the CD-oriented laser light is lower than 5%, the reliability of the tracking error signal acquired by the three-beam method is lower. On the other hand, if the efficiency of diffraction of the DVD-oriented laser light is higher than 5%, the DVD-oriented laser light will unnecessarily be split, causing increased stray light and reduced for light power utilization efficiency.

By selecting a depth of the slits in the diffraction grating 17 for the efficiency of diffraction of the first-order light of the DVD-oriented laser light to be lower than 5% while the efficiency of diffraction of the first-order light of the CD-oriented laser light to be higher than 5%, the CD-oriented optical system can detect a tracking error signal by the three-beam method with improved reliability and the DVD-oriented optical system can prevent stray light from occurring and can prevent lowering of the efficiency for light power utilization.

Next, reading of information from the optical disc 2 by the optical head 1 according to the aforementioned invention will be described.

When the optical disc 2 is a CD, a CD-oriented laser light having a wavelength of approximately 785 nm is emitted from the first light emitter 11. The CD-oriented laser light emitted from the first light emitter 11 is incident upon the diffraction grating 17.

The incident laser light is split by the diffraction grating 17 into at least three beams: zero-order diffracted light, positive first-order diffracted light and negative first-order diffracted light, tangentially of the optical disc 2. The CD-oriented laser light split by the diffraction grating 17 is incident upon the wave plate 16 via the holographic element 18.

The CD-oriented laser light incident upon the wave plate 16 is elliptically polarized by the wave plate 16. The wave plate 16 polarizes the DVD-oriented laser light, and therefore the polarized condition of the CD-oriented laser light is not important. The CD-oriented laser light thus elliptically polarized by the wave plate 16 is incident upon the collimator lens 4.

The collimator lens 4 is provided between the integrated optical module 3 and optical disc 2 to shape the incident CD-oriented laser light into a parallel light. This parallel CD-oriented laser light is incident upon the objective lens 5.

The objective lens 5 is provided between the collimator lens 4 and optical disc 2 to focus the parallel CD-oriented laser light from the collimator lens 4 on a desired track on the recording surface of the rotating optical disc 2.

The CD-oriented laser light focused by the objective lens 5 on the recording surface of the optical disc 2 is reflected at the recording surface of the optical disc 2. The return light, namely, the reflected CD-oriented laser light from the recording surface of the optical disc 2, is incident upon the holographic element 18 through the objective lens 5, collimator lens 4 and wave plate 16.

The holographic element 18 splits the return light from the optical disc by diffraction. The return light is split by the holographic element 18 is perpendicular to the direction in which the light is split by the diffraction grating 17. All of the three beams resulting from the splitting of the incident laser light by the diffraction grating 17 tangentially of the optical disc 2 are guided to the holographic element 18 as mentioned above, and the three return light beams are further split by the holographic element 18 radially of the optical disc 2 into six beams.

The six return light beams from the holographic element 18 are incident upon the light detector 13 and define six light spots on the light detector 13.

Figure 5:
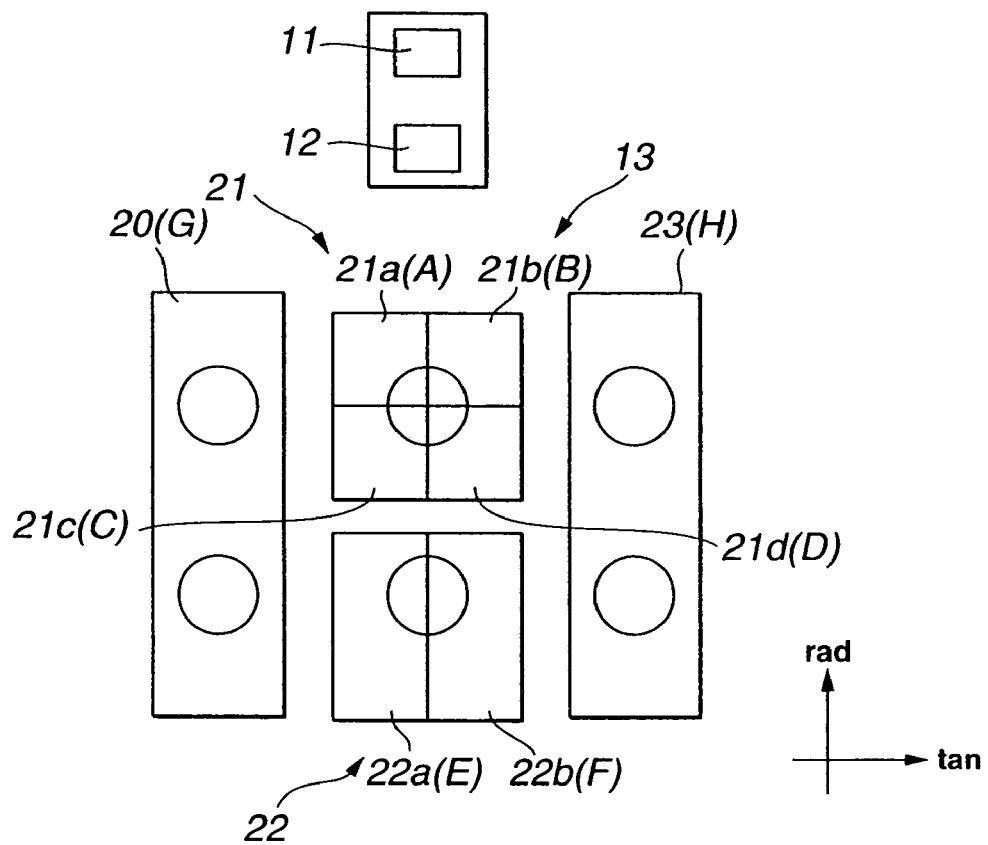
FIG. 5 is a schematic representation of the light detector in FIG. 2.

FIG. 5 shows a preferred embodiment of the light detector in FIG. 2. As shown in FIG. 5, the light detector 13 includes first to fourth photodetectors 20 to 23 disposed tangentially of the optical disc 2.

Of the four photodetectors 20 to 23, the first photodetector 20 is generally rectangular and is disposed to have the length thereof directed radially of the optical disc 2. The first photodetector 20 provides an output signal G corresponding to the quantity of light it has detected.

The second photodetector 21 is generally square. It further includes four identical photodetective areas 21a, 21b, 21c and 21d formed by dividing the second photodetector 21 by two line segments parallel to two sides thereof perpendicular to each other. These first to fourth photodetective areas 21a to 21d provide output signals A, B, C and D, respectively, corresponding to the quantities of light they have detected, respectively.

The third photodetector 22 is generally square, and includes two identical photodetective areas 22a and 22b formed by bisecting the third photodetector 22 with a live segment extending radially of the optical disc 2. These photodetective areas 22a and 22b provide output signals E and F, respectively, corresponding to the quantities of light they have detected, respectively.

The fourth photodetector 23 is generally rectangular and is disposed to have the length thereof directed radially of the optical disc 2. This photodetector 23 provides an output signal H corresponding to the quantity of light it has detected.

The return light from the optical disc 2 defines a light spot on each of the first to fourth photodetectors 20 to 23. Since the diffraction pattern of the holographic element 18 is bisected, two light spots are defined on each of the first and fourth photodetectors 20 and 23.

The light spots defined on the second and third photodetectors 21 and 22, respectively, are derived from the return light of the zero-order light from the diffraction grating 17, reflected at the track center of the optical disc 2. The light spots defined on the first and fourth photodetectors 20 and 23, respectively, are derived from the return light beams of the negative and positive first-order light beams from the diffraction grating 17, reflected at positions, respectively, offset to the right and left of the track on the optical disc 2.

Therefore, the tracking error signal TRK is given as follows by the three-beam method:

$$TRK = G - H \qquad (7)$$

The focus error signal FES is given as follows by the double Foucault method:

$$FES=\{(A+C)+F\}-\{(B+D)+E\} \quad (8)$$

The read signal RF is given as follows:

$$RF=A+B+C+D+E+F \quad (9)$$

When the optical disc 2 is a DVD, a DVD-oriented laser light having a wavelength of approximately 655 nm is emitted from the second light emitter 12. The DVD-oriented laser light emitted from the second light emitter 12 is incident upon the diffraction grating 17.

Since the efficiency of diffraction of the first-order light of the DVD-oriented laser beam of approximately 655 nm in wavelength is set nearly zero, the DVD-oriented laser light is slightly diffracted and is passed as a zero-order light through the diffraction grating 17.

The DVD-oriented laser light having passed through the diffraction grating 17 is incident upon the wave plate 16 via the holographic element 18.

The DVD-oriented laser light incident upon the wave plate 16 is circularly polarized by the wave plate 16. The DVD-oriented laser light thus circularly polarized by the wave plate 16 is incident upon the collimator lens 4.

The collimator lens 4 shapes the incident DVD-oriented laser light into a parallel light. This parallel DVD-oriented laser light is incident upon the objective lens 5.

The objective lens 5 focuses the parallel DVD-oriented laser light from the collimator lens 4 on a desired track in the recording surface of the rotating optical disc 2.

The DVD-oriented laser light focused by the objective lens 5 on the recording surface of the optical disc 2 is reflected at the recording surface of the optical disc 2, and is incident upon the holographic element 18 through the objective lens 5, collimator lens 4 and wave plate 16. When passed through the wave plate 16, this return light is in the form of a linearly polarized light rotated 90 deg. in relation to the outgoing polarized direction.

The holographic element 18 splits the return light from the optical disc 2 radially of the optical disc 2 by diffraction. The return light split by the holographic element 18 is incident upon the light detector 13 and defines six light spots on the light detector 13.

The tracking error signal TRK is given as follows by calculating a phase difference between the output signals from the photodetective areas, respectively, by the DPD (Differential Phase Detection) method:

$$TRK=\{(A+D)-(B+C)\} \quad (10)$$

The focus error signal FES is given as follows by the double Foucault method:

$$FES=\{(A+C)+F\}-\{(B+D)+E\} \quad (11)$$

The read signal RF is given as follows:

$$RF=A+B+C+D+E+F \quad (12)$$

Figure 6:
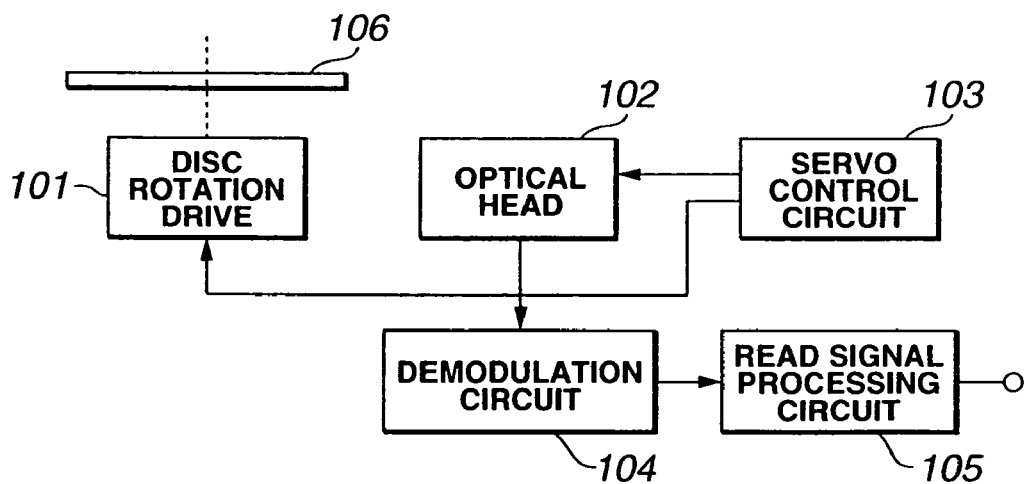
FIG. 6 is a block diagram of a preferred embodiment of an optical recording and/or reproducing apparatus in accordance with the teachings of the present invention.
Figure 7:
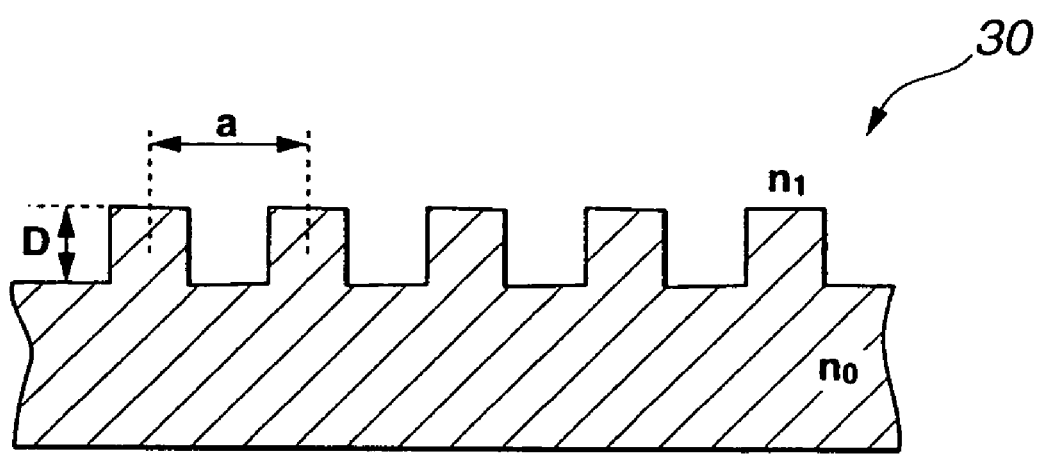
FIG. 7 shows an example of the slits formed in a conventional diffraction grating.

Next, the optical recording and/or reproducing apparatus incorporating the optical head as set forth above is described with respect to FIG. 6.

FIG. 6 is a block diagram of an optical recording and/or reproducing apparatus in accordance with the present invention. As shown, the optical recording and/or reproducing apparatus includes a disc rotation drive 101, an optical head 102, servo control circuit 103, demodulation circuit 104 and a signal processing circuit 105. The disc rotation drive 101, for example, a spindle motor, rotates an optical disc 106 at a predetermined speed.

The optical head 102 is arranged as aforedescribed. It irradiates a laser light onto the recording surface of the rotating optical disc 106, and detects a return light from the recording surface of the optical disc 106 to provide a signal.

The servo control circuit 103 controls the spindle servo mechanism to run the disc rotation drive 101 at the predetermined speed and controls the optical head 102 to provide a focus servo control, tracking servo control and radial servo control.

The demodulation circuit 104 demodulates a read signal output from the optical head 102.

The signal processing circuit 105 makes an error correction of the signal demodulated by the demodulation circuit 104 and further processes the signal.

The optical disc 106 is rotated by the disc rotation drive 101 at a predetermined speed. Irradiating a laser light to the optical disc 106, the optical head 102 reads information recorded on the recording surface of the optical disc 106. The servo control circuit 103 controls the spindle servo to run the disc rotation drive 101 at the predetermined speed and also the optical head 102 to provide a focus servo control, tracking servo control and radial servo control.

A read signal provided as an output from the optical head 102 is demodulated by the demodulation circuit 104, and is then supplied to the signal processing circuit 105 where it is subject to an error correction and other processing. The output from the signal processing circuit 105 is thereafter delivered to a circuit (not shown).

The present invention has been described with reference to an embodiment of the optical head having a light source which emits a light beam of about 650 nm in wavelength and another light source which emits a light beam having a wavelength of about 780 nm. However, the present invention is not limited to this embodiment, but it can be applied to an optical head having light sources which emit light beams of different wavelengths than as set forth above, and an optical head having three or more light sources which emit light beams different in wavelength from each other.

Also the present invention has been described with reference to an optical head compatible with CD and DVD as the optical disc 2. However, the present invention is not limited to such an optical head, but it can widely be applied to various types of optical heads for recording information media to and/or from the optical disc, including, but not limited to, read-only optical discs, recordable optical disc, magneto-optical discs, etc.

In the optical head according to the present invention, the depth of slits in the diffraction grating is optimized so that only one of the two or more light beams different in wavelength from each other and incident upon the diffraction grating can be diffracted.

Therefore, in the optical head according to the present invention, the occurrence of stray light unnecessarily diffracted is prevented and the efficiency of light power utilization is improved.

Furthermore, in the optical head according to the present invention, the diffraction grating can be disposed even where two or more light beams of different wavelengths travel through the same optical path, which permits the optical system to be more freely designed.

In the optical recording and/or reproducing apparatus according to the present invention, the depth of slits in the diffraction grating is optimized so that only one of the two or more light beams different in wavelength from each other and incident upon the diffraction grating is diffracted.

Therefore, in the optical recording and/or reproducing apparatus according to the present invention, the occurrence of stray light unnecessarily diffracted can be prevented and the efficiency of light power utilization is improved.

Furthermore, in the optical recording and/or reproducing apparatus according to the present invention, the diffraction grating can be disposed even where two or more light beams of different wavelengths travel through the same optical path, which permits the optical system to be designed more freely.

Although the invention has been particularly shown and described with reference to certain preferred embodiments, it will be readily appreciated by those of ordinary skill in the art that various changes and modifications may be made therein without departing from the spirit and scope of the invention. It is intended that the appended claims be interpreted as including the foregoing as well as various other such changes and modifications.

What is claimed is:

1. An optical head comprising:
    a light emitter/detector for emitting a laser light towards a recording surface of an optical disc having information optically recorded thereon and detecting a return light component of the laser light reflected at the recording surface of the optical disc to detect at least a tracking error signal;
    a diffraction grating provided between the light emitter/detector and the optical disc to split the laser light emitted from the light emitter/detector into at least three beams, including zero-order diffracted light, positive first-order diffracted light and negative first-order diffracted light;
    a light converging optical system provided between the diffraction grating and optical disc to converge the lights split by the diffraction grating to the recording surface of the optical disc;
    the light emitter/detector comprising a first light source to emit a first light beam of a first wavelength and a second light source to emit a second light beam of a second wavelength which is less than said first wavelength; and
    the diffraction grating having formed therein a plurality of slits whose depth is predetermined so that the efficiency of diffraction of first-order light generated when the first light beam having the first wavelength is incident upon the diffraction grating is higher than that of the efficiency of diffraction of first order light generated when the second light beam having the second wavelength is incident upon the diffraction grating, wherein the depth of the slits formed in the diffraction grating is selected so that the efficiency of diffraction of first-order light when the first light beam is incident upon the diffraction grating is higher than 5% while the efficiency of diffraction of first-order light when the second light beam is incident upon the diffraction grating is lower than 5%.

2. An optical recording and/or reproducing apparatus comprising:
    means for rotating an optical disc having information recorded thereon; an optical head to emit a light towards a recording surface of the optical disc and to detect a return light from the optical disc; and
    a signal processing circuit to process a signal detected by the optical head;
    the optical head comprising:
    a light emitter/detector for emitting a laser light towards a recording surface of an optical disc having information optically recorded thereon and detecting a return light component of the laser light reflected at the recording surface of the optical disc to detect at least a tracking error signal;
    a diffraction grating provided between the light emitter/detector and the optical disc to split the laser light emitted from the light emitter/detector into at least three beams, including zero-order diffracted light, positive first-order diffracted light and negative first-order diffracted light;
    a light converging optical system provided between the diffraction grating and optical disc to converge the lights split by the diffraction grating to the recording surface of the optical disc;
    the light emitter/detector comprising a first light source to emit a first light beam and a second light source to emit a second light beam having a second wavelength which is less than said first wavelength; and
    the diffraction grating having formed therein a plurality of slits whose depth is predetermined so that the efficiency of diffraction of first-order light generated when the first light beam having the first wavelength is incident upon the diffraction grating is higher than that when the second light beam having the second wavelength is incident upon the diffraction grating, wherein the depth of the slits formed in the diffraction grating is selected so that the efficiency of diffraction of first-order light when the first light beam is incident upon the diffraction grating is higher than 5% while the efficiency of diffraction of first-order light when the second light beam is incident upon the diffraction grating is lower than 5%.

* * * * *